(12) United States Patent
Gloden et al.

(10) Patent No.: US 8,005,570 B2
(45) Date of Patent: Aug. 23, 2011

(54) ROBOTIC TOOL CHANGER

(75) Inventors: Michael L. Gloden, Apex, NC (US); Leonard Aaron Odham, Raleigh, NC (US); Mark D. Bordeaux, Apex, NC (US)

(73) Assignee: ATI Industrial Automation, Apex, NC (US)

( * ) Notice: Subject to any disclaimer, the term of this patent is extended or adjusted under 35 U.S.C. 154(b) by 1362 days.

(21) Appl. No.: 11/374,706

(22) Filed: Mar. 14, 2006

(65) Prior Publication Data

US 2007/0235949 A1  Oct. 11, 2007

(51) Int. Cl.
*G06F 19/00* (2006.01)

(52) U.S. Cl. ......... 700/245; 700/90; 403/31; 403/322.1; 403/322.2; 403/322.3

(58) Field of Classification Search .............. 700/245
See application file for complete search history.

(56) References Cited

U.S. PATENT DOCUMENTS

| | | | | |
|---|---|---|---|---|
| 4,335,500 A * | 6/1982 | Munekata et al. | ........ | 483/59 |
| 4,636,135 A * | 1/1987 | Bancon | ........ | 414/730 |
| 4,679,956 A * | 7/1987 | Douglas et al. | ........ | 403/14 |
| 4,696,524 A * | 9/1987 | Cloyd | ........ | 439/197 |
| 4,759,686 A * | 7/1988 | Kirst | ........ | 414/729 |
| 4,815,780 A * | 3/1989 | Obrist | ........ | 294/86.4 |
| 4,886,467 A * | 12/1989 | Peveto | ........ | 439/192 |
| 4,906,123 A * | 3/1990 | Weskamp et al. | ........ | 403/322.2 |
| 5,002,500 A * | 3/1991 | Zuccaro et al. | ........ | 439/348 |
| 5,211,501 A * | 5/1993 | Nakamura et al. | ........ | 403/322.3 |
| 5,522,303 A * | 6/1996 | Stoll et al. | ........ | 92/27 |
| 5,918,870 A * | 7/1999 | Stark | ........ | 269/309 |
| 6,375,378 B1 * | 4/2002 | Kitaura | ........ | 403/31 |
| 6,398,279 B1 * | 6/2002 | Kikut | ........ | 294/86.4 |
| 6,752,037 B1 * | 6/2004 | Miyazawa | ........ | 74/490.01 |
| 7,252,453 B1 * | 8/2007 | Little | ........ | 403/322.2 |
| 2002/0067045 A1 * | 6/2002 | Blanchard | ........ | 292/252 |
| 2006/0041328 A1 * | 2/2006 | McCormick | ........ | 700/179 |
| 2007/0228670 A1 * | 10/2007 | Norton et al. | ........ | 279/2.11 |

FOREIGN PATENT DOCUMENTS

WO  03101673 A  12/2003

* cited by examiner

*Primary Examiner* — Khoi Tran
*Assistant Examiner* — Jonathan L Sample
(74) *Attorney, Agent, or Firm* — Coats & Bennett, P.L.L.C.

(57) ABSTRACT

A robotic tool changer having a master unit and a tool unit adapted to be coupled together. Movably mounted in the master unit of the robotic tool changer is a piston that is movable between locked and unlocked positions. The piston includes a contact area having an unlocking surface, a failsafe surface and a locking surface. Also provided is a series of rolling members contained within a retention area that are actuated by the piston to lock the master unit to the tool unit. For example, the piston engages the rolling members and urges them into a locked relationship with a bearing race that forms a part of the tool unit. To prevent the inadvertent or accidental movement of the piston from the locked position to the unlocked position, the piston is provided with a retarding surface generally disposed between the locking surface and the unlocking surface on the piston for retarding the movement of the piston as the piston moves from the locked position to the unlocked position.

45 Claims, 13 Drawing Sheets

ROBOTIC TOOL CHANGER

FIELD OF THE INVENTION

The present invention relates to robotic tool changers, and more particularly to robotic tool changers having a master unit and a tool unit adapted to be coupled together.

BACKGROUND OF THE INVENTION

Robotic tool changers generally comprise a master unit and a tool unit. Typically the master unit is supported from a robotic arm while the tool unit is coupled to the master unit and supports a tool. In some designs, to couple the master and tool units together, the master unit is provided with a fluid actuated piston that includes a contact area for engaging a series of balls that are normally held in a ball retention area of the master unit. When the master unit and tool unit are engaged for connection, the contact area of the piston engages the ball and positions the balls outwardly where the balls engage a bearing race formed in the tool unit. The geometry of the bearing race and the manner of urging the balls into the bearing race causes the master unit and tool unit to be pulled together into a locked position.

The contact area of the piston, sometimes referred to as a cam, is particularly configured to provide two distinct functions. First the contact surface is provided with a locking surface. When the locking surface engages the balls, the geometry of the locking surface causes the balls to engage the bearing race of the tool unit such that the tool unit is pulled into a locked position within the master unit. Also disposed on the contact area is what is typically referred to as a failsafe surface. The function of the failsafe surface is to engage the balls and aid in maintaining a coupled relationship between the master unit and tool unit when there has been a failure of the fluid supply system to the piston, or when the supply of fluid has been temporarily shut off or otherwise interrupted. In other words, the failsafe surface, on a temporary basis, prevents the piston and its contact surface from moving directly from a locked position to an unlocked position. However, failsafe surfaces found on pistons are cylindrical and extend generally parallel to the longitudinal axis of the piston. Thus, when such a failsafe surface engages the balls, there is no opposing force to be overcome in order for the piston to move from the locked position to the unlocked position. In some situations it may be possible for the piston to accidentally move past the failsafe position. For example, it is conceivable that because of vibrations or shocks or other external forces that the piston can accidentally move past the failsafe position to the unlocked position.

SUMMARY OF THE INVENTION

The present invention entails a robotic tool changer having first and second units adapted to be coupled together. Mounted in one unit is a fluid actuated piston that moves between locked and unlocked positions. In the locked position the piston engages a series of rolling members and urges the rolling members into engagement with the other unit to lock the two units together. To prevent the piston from inadvertently or accidentally moving from the locked position to the unlocked position, the piston includes a failsafe or retarding surface that is shaped or configured to retard the movement of the piston as the piston moves from the locked position to the unlocked position.

In addition, the present invention entails a robotic tool changer having a first unit, a second unit, and a plurality of rolling members disposed in one of the units. A piston is movably mounted in one of the units of the robotic tool changer and movable between locked and unlocked positions. The piston includes a stem movable back and forth through an opening in the robotic tool changer. The stem of the piston and the opening are configured so as to at least slightly restrain the movement of the piston during at least a portion of the piston's movement as the piston moves from the locked position to the unlocked position. This restraint is intended to prevent the piston from inadvertently or accidentally assuming the unlocked position.

Other objects and advantages of the present invention will become apparent and obvious from a study of the following description and the accompanying drawings which are merely illustrative of such invention.

DESCRIPTION OF EXEMPLARY EMBODIMENT

Figure 1:
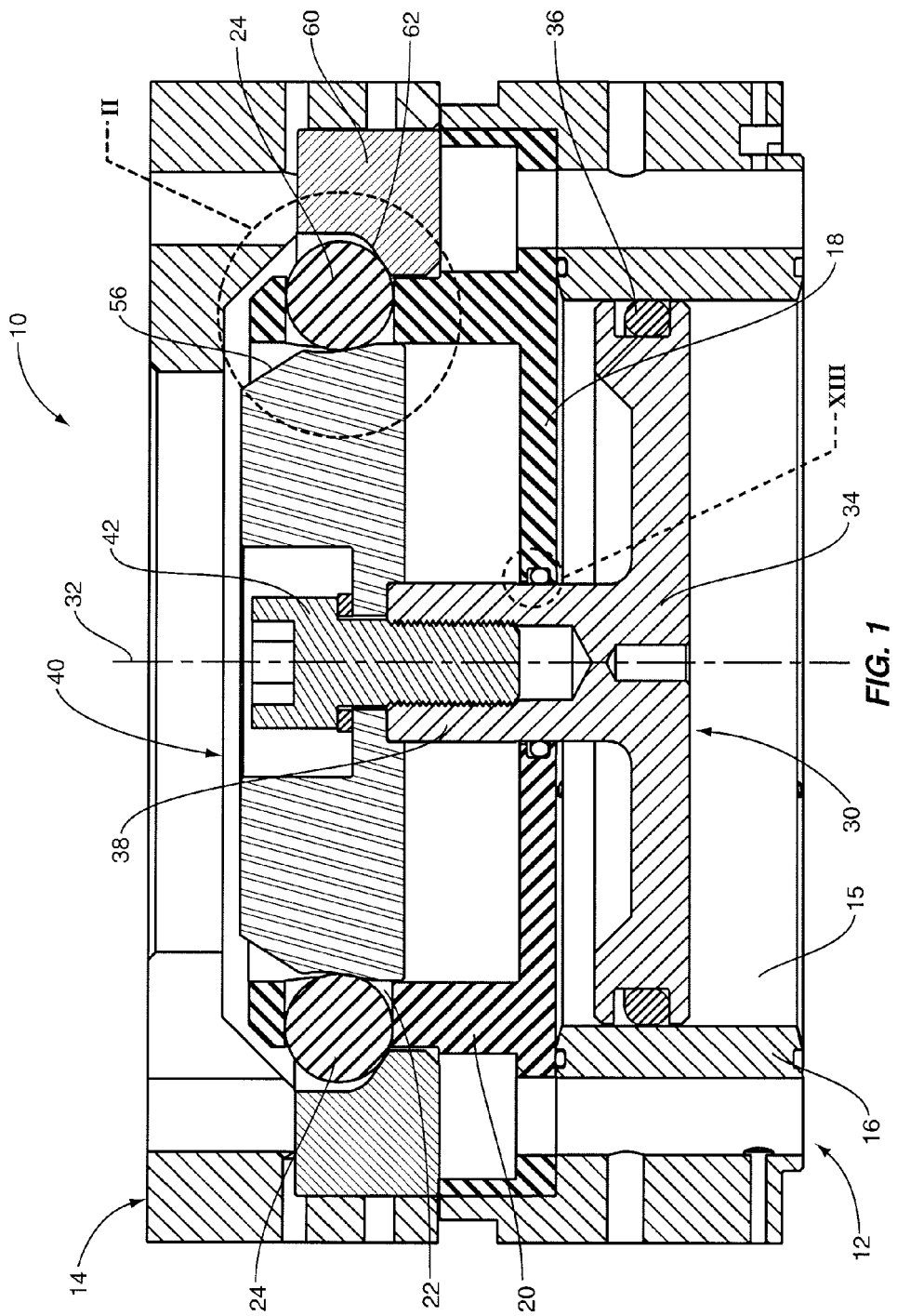
FIG. 1 is a cross-sectional view of the robotic tool changer of the present invention showing the piston of the tool changer in a locked position.

With further reference to the drawings, the robotic tool changer of the present invention is shown therein and indicated generally by the numeral 10. Tool changer 10 basically comprises a first unit and a second unit that are adapted to be coupled together. The first unit is indicated generally by the numeral 12 and is sometimes referred to as a master unit. The second unit is indicated generally by the numeral 14 and sometimes referred to as the tool unit. In use, the first or master unit 12 is typically connected to a robotic arm (not shown) while the second or tool unit 14 is typically connected to a particular tool. Furthermore, in use there may be provided a series of tool units 14 with each tool unit carrying or supporting a particular tool. Hence, during use, the respective tool units 14 are coupled and decoupled to the first and master unit 12. The robotic tool changer 10 disclosed herein is similar in many respects to that disclosed in U.S. Pat. No. 5,211, 501, which is expressly incorporated herein by reference.

Since most robotic systems typically include a robotic arm, a master unit 12 and a plurality of tool units 14, each coupled to a different tool, it is common to locate active components of the tool changer 10 within the master unit 12. However, it is appreciated that the distribution of active and passive components within the master unit 12 and the tool unit 14 can be reversed. Although the master unit 12 is typically connected to a robotic arm and the tool unit 14 is connected to a robotic tool, this particular orientation may be reversed in any given application.

As discussed below, one of the principal functions of the robotic tool changer 10 is to provide a system for quickly and efficiently coupling and decoupling tool units 14 to the master unit 12. However, the robotic tool changer 10 includes additional facilities for the provision of various services and utilities to the attached tool. For example, it is common to provide a master electrical contact with the master unit 12. This permits electrical service to be channeled through the master unit 12, through the tool unit 14 and ultimately to the tool. For example, relatively large electrical currents such as those utilized by a welding tool can be passed from an electrical source through the robotic system to the tool unit 14. In like fashion, fluids such as pneumatics can be transferred through the master unit 12 to the tool unit 14 for use by a particular tool connected thereto. Other such services and utilities, which are typically provided by robotic tool changers include hydraulic fluid, cooling fluid, oil, and data transfer. Details of these services and utilities are not dealt with here in detail because such is not per se material to the present invention and because robotic tool changers of the general type shown herein are commercially known and available.

Turning now to a discussion of the first or master unit 12, the same is provided with a fluid chamber 15. See FIG. 1. In the design illustrated the fluid chamber 15 is cylindrical and includes a cylindrical wall 16. Adjacent to the fluid chamber 15 is a structure that includes a horizontal member 18 that includes an annular ring 20 projecting therefrom. Horizontal member 18 forms one end of the fluid chamber 15. Additionally, horizontal member 18 includes a central opening 18A having an O-ring 18B secured in an annular groove formed in the central opening. Formed in the annular ring 20 is a series of apertures or openings 22. A rolling member 24 is generally held or disposed in each of the apertures or openings 22. The area in and around the apertures 22 is sometimes referred to as a retention area because this area tends to at least partially retain the rolling members 24 that, as will be discussed subsequently herein, are utilized to lock the master unit 12 with the tool unit 14.

Disposed within the fluid chamber 15 is a double acting piston indicated generally by the numeral 30. Piston 30 is actuated back and forth in the fluid chamber 15 by a pressurized fluid source. In one embodiment, the piston 30 is pneumatically moved back and forth. Piston 30 includes a longitudinal axis indicated by the numeral 32. Further, piston 30 includes a base 34 that is slidably contained within the fluid chamber 15 and forms a fluid tight seal with the chamber to prevent air or other fluid from bypassing the base. More particularly, the base 34 is provided with an O-ring 36 that seals against the cylindrical wall 16 of the fluid chamber 15. Centered with respect to the base 34 is a stem 38. Preferably the longitudinal axis 32 extends centrally through the stem 38. As seen in FIG. 1 stem 38 extends through the opening 18A formed in the horizontal member 18. Secured to the stem is a generally cylindrical head indicated generally by the numeral 40. A screw 42 extends through a portion of the head 40 and into a threaded cavity formed in the stem 18. By tightening the screw 42 the head 40 of the piston 30 is coupled or connected to the base 34 of the piston.

The outer perimeter of the head 40 is configured to engage the rolling members 24 to effectuate locking the master unit 12 to the tool unit 14. The outer perimeter of the head is particularly configured to cooperate with the locking members 24 to achieve both a locking and an unlocking function. Accordingly, the outer perimeter or outer area of the head 40 includes a contact area for contacting the rolling members 24 and for urging the rolling members 24 into a locked relationship with a portion of the tool unit 14 to be described subsequently herein.

Viewing the contact area of the head 40, it is seen that as viewed in FIGS. 1-7B that the head includes a locking surface 50. Locking surface 50 is disposed at a taper or an angle with respect to the longitudinal axis 32. Note as viewed in FIGS. 7A and 7B, the locking surface 50 tapers generally upwardly and inwardly with respect to the longitudinal axis 32. As will be discussed subsequently herein, when the piston 30 assumes the locked position, locking surface 50 will engage the respective rolling members 24 and cause the rolling members 24 to engage a portion of the tool unit 14 and lock the master unit 12 and the tool unit 14 together.

Figure 2:
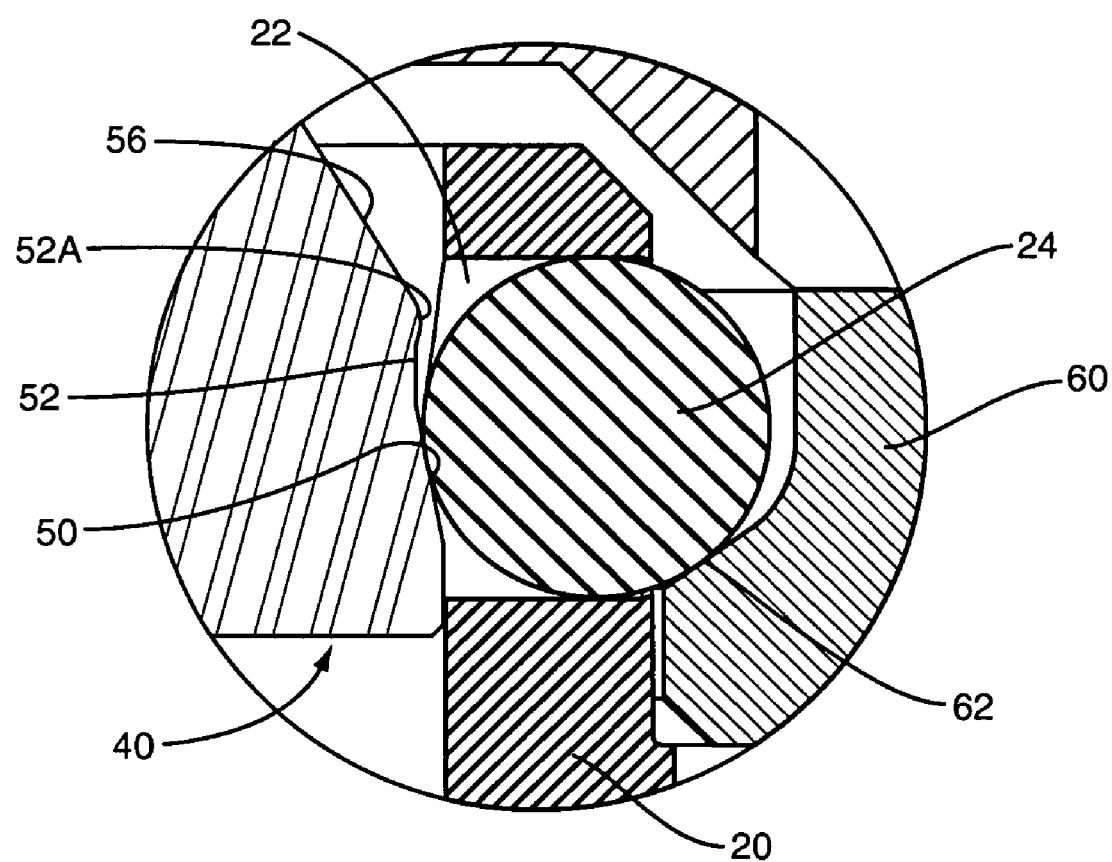
FIG. 2 is an enlarged view of the portion of the tool changer encircled in FIG. 1 and indicated by II.
Figure 3:
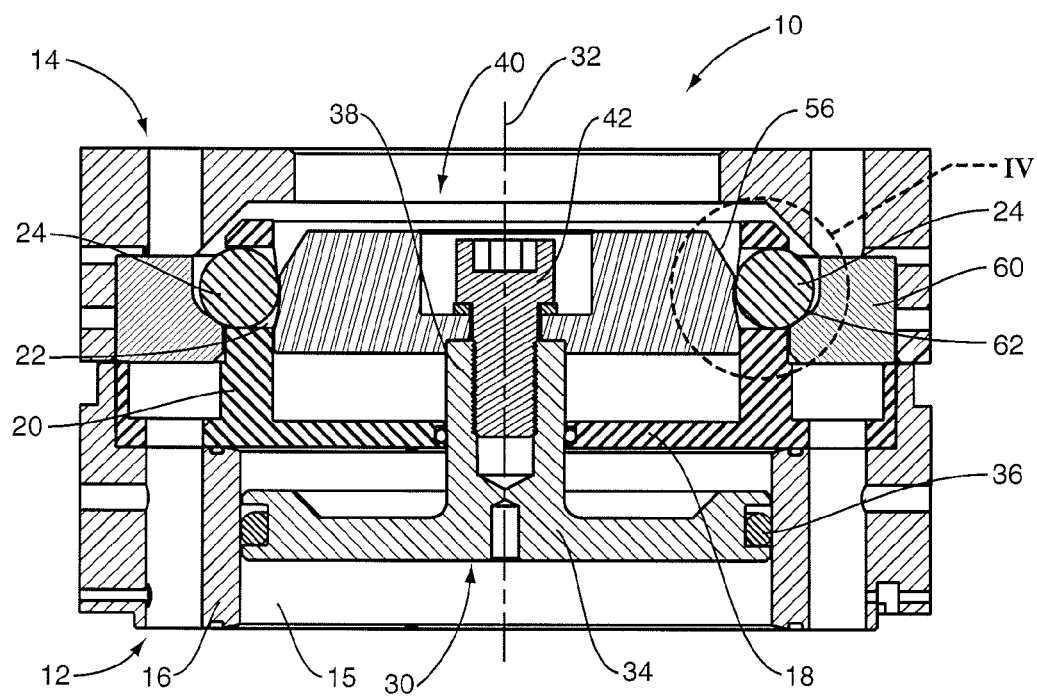
FIG. 3 is a view similar to FIG. 1, but showing the piston in a failsafe position.
Figure 4:
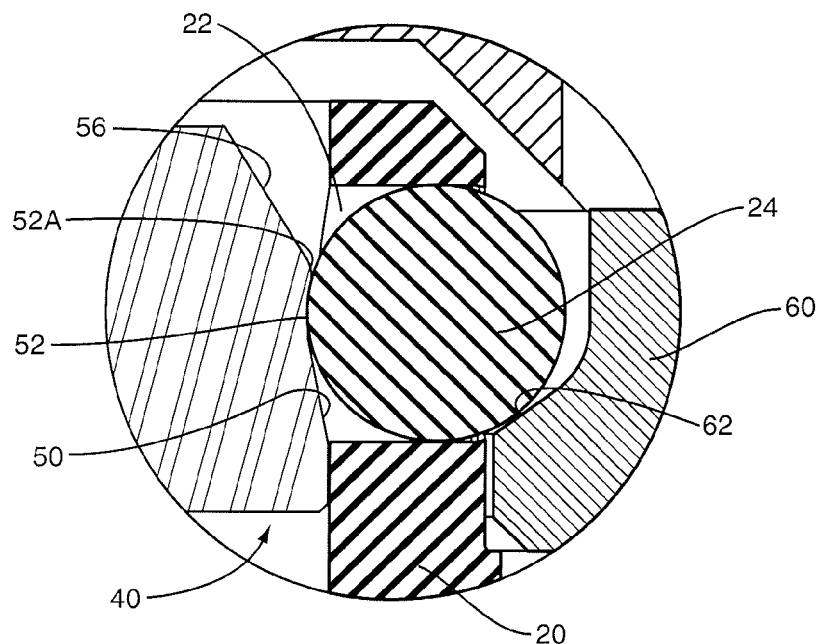
FIG. 4 is an enlarged view of the encircled portion of FIG. 3 indicated by IV.
Figure 5:
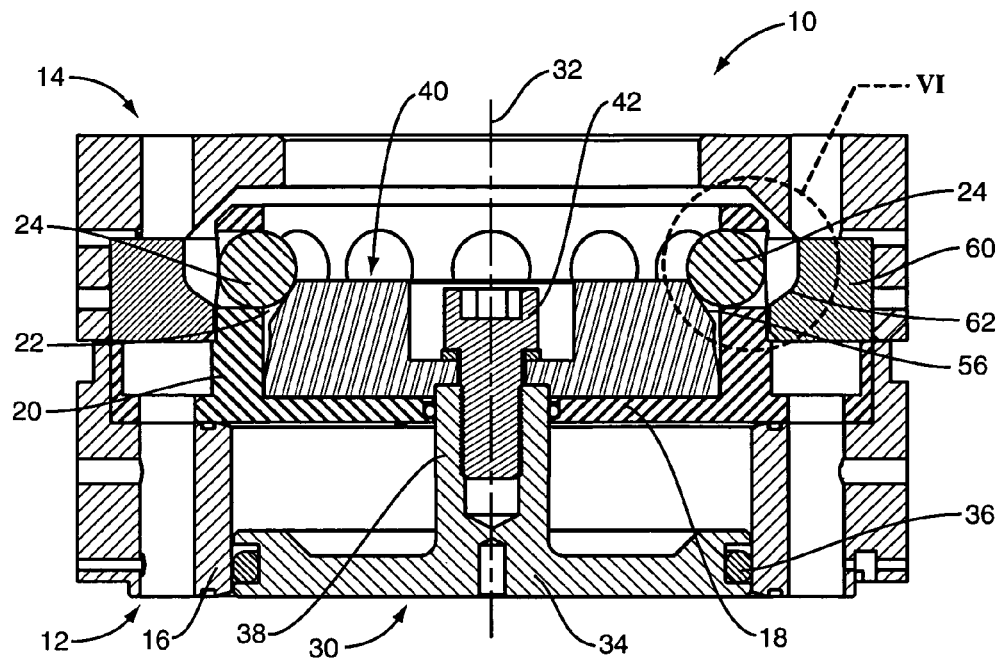
FIG. 5 is a view similar to FIG. 1, but showing the piston in an unlocked position.
Figure 6:
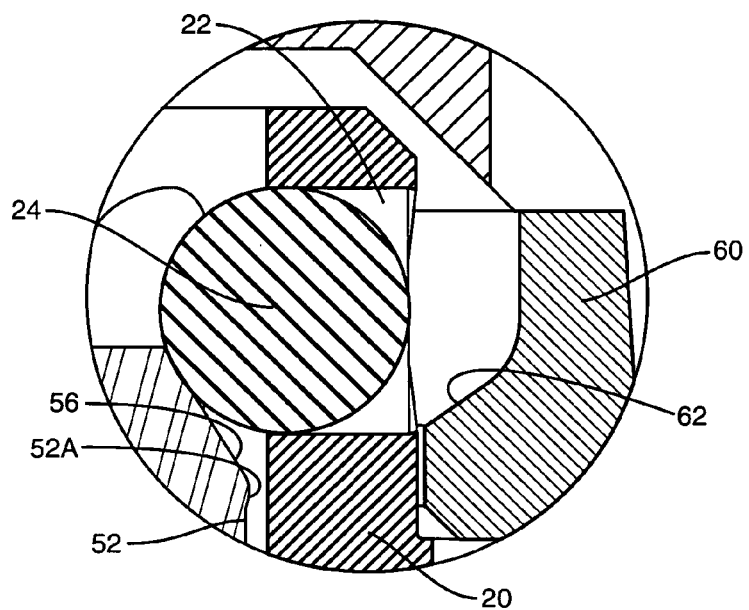
FIG. 6 is an enlarged view of the encircled portion indicated by VI in FIG. 5.

Also formed on the contact area of the piston head 40 is a contact surface 56 that is sometimes referred to as an unlocking surface. As seen in FIGS. 2, 4 and 6, the contact surface 56 is tapered upwardly and inwardly towards the longitudinal axis 32. Contact surface 56 provides two functions. As the piston 30 moves from the unlocked position to the locked position, the contact surface 56 surrounding the head 40 of the piston will contact the rolling members 24 and urge the same outwardly through the openings or apertures 22 formed in the annular ring 20. Thus, surface 56 can be referred to as a contact surface. In addition, when the piston 30 assumes the unlocked position, the contact surface 56 will lie adjacent the rolling members 24 as shown in FIG. 6. Because of the shape of the apertures 22 and the position and shape of the contact surface 56, the rolling members 24 are permitted to move to one side of the apertures 22 as shown in FIG. 6. The contact surface 56 of the piston 30 will prevent the rolling members 24 from falling from the apertures 22. At the same time, the position of the rolling members 24 will permit the tool unit 14 to be decoupled from the master unit 12 without interference from the rolling members 24. Thus, the surface 56 is sometimes referred to as an unlocking surface.

Disposed adjacent the locking surface 50 is a failsafe surface 52. In this embodiment, a portion of the failsafe surface 52 includes a generally cylindrical surface that extends generally parallel to the longitudinal axis 32 of the piston 30. The failsafe surface 52 also includes another portion which is referred to as a retarding surface 52A. As seen in the drawings, the failsafe surface 52 extends generally between the locking surface 50 and the unlocking surface 56. The cylindrical portion of the failsafe surface 52 is disposed adjacent the locking surface 50. The retarding portion 52A of the locking surface is disposed adjacent the unlocking surface 56. The purpose of the failsafe surface 52 is to prevent the piston 30 from inadvertently or accidentally moving from the locked position shown in FIG. 1 to the unlocked position shown in FIGS. 5 and 6. More particularly, in the locked position shown in FIG. 1, the rolling members 24 will cause a force to be directed against the piston head 40 that will tend to drive the piston to the unlocked position in the event of an interruption in the actuating force that urges the piston to the locked position. If there is an inadvertent interruption in the actuating force acting on the piston 30, then the piston will tend to move from the locked position in FIG. 1 to the failsafe position shown in FIGS. 3 and 4. The cylindrical portion of the failsafe surface 52 will, in many cases, aid in maintaining a coupled relationship between the master unit 12 and the tool unit 14. However, the normal force directed against the rolling members 24 by the cylindrical portion of the failsafe surface 52 will produce no significant force component in the axial direction. However, the retarding surface 52A that forms a part of the failsafe surface 52 projects at least slightly outwardly from the cylindrical portion of the failsafe surface. The engagement of the retarding surface 52A with the rolling members 24 will give rise to at least a slight resistance to further movement of the piston towards the unlocked position.

In the case of the embodiment illustrated in FIGS. 1-7B, the retarding surface 52A assumes the form of a ridge. Note that the ridge that forms the retarding surface 52A is disposed generally between the cylindrical portion of the failsafe surface 52 and the contact or unlocking surface 56. Although the dimensions of the ridge may vary, it is contemplated that the ridge may project outwardly approximately 0.010 to 0.040 inches past the cylindrical portion of the failsafe surface. Note the relationship of the retarding surface 52A in FIGS. 7A and 7B. Here the ridge forming the retarding surface 52A lies generally between the unlocking surface 56 and the cylindrical portion of the failsafe surface 52. In this design there appears a slight concave in the contact area of the head just above the cylindrical portion of the failsafe surface 52. Hence, the rolling members 24 will be at least slightly compressed between the ridge and the locking surface 62 of the locking race 60 as the piston 30 moves past the ridge to the unlocked position of FIG. 6 as the rolling members 24 are required to clear the ridge in the process.

Turning to the tool unit 14, as discussed above, the master unit 12 is adapted to be coupled to the tool unit. In order to lock with the master unit 12, the tool unit 14 is provided with a locking race 60. The locking race 60, which forms a part of the tool unit 14, is designed to be inserted into the master unit 12 and to assume a position outwardly of and adjacent the rolling members 24. See FIGS. 1-6. Locking race 60 includes a locking surface 62. To lock the tool unit 14 with the master unit 12, the piston 30 is actuated and driven upwardly as viewed in FIG. 1. Eventually the locking surface 50 of the piston 30 will engage the rolling members 24 urging them outwardly through the apertures 22 of the annular ring 20. The rolling members 24 will engage the locking surface 62 that forms a part of the tool unit 14 and will urge the locking race 60 downwardly as viewed in FIG. 1 into the locked position shown therein.

Figure 7A:
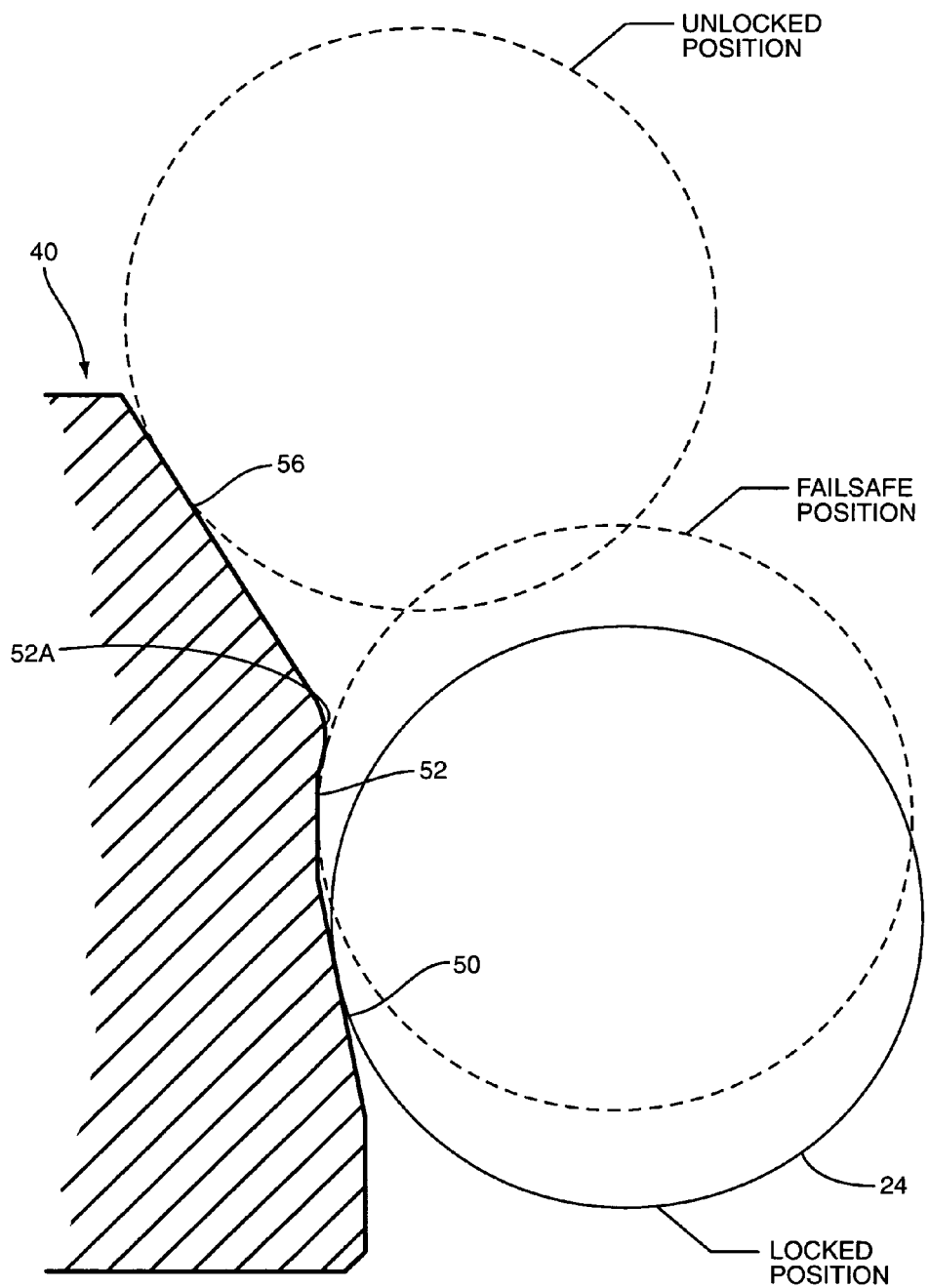
FIG. 7A is a schematic illustration showing the relationship between a portion of the piston and a rolling member as the piston moves between locked, failsafe, and unlocked positions.
Figure 7B:
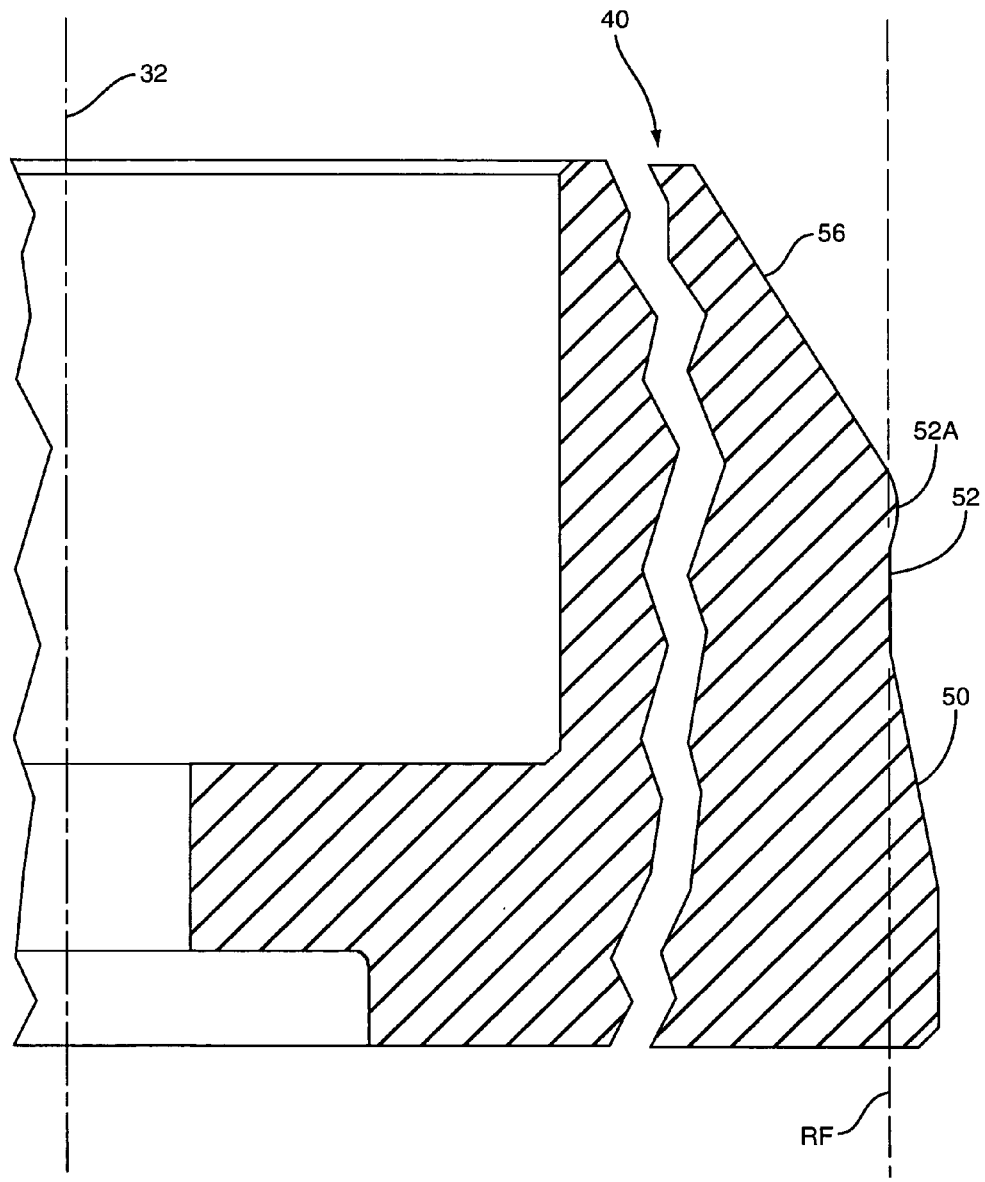
FIG. 7B is a schematic illustration similar to FIG. 7A, but illustrating the contact area of the piston with respect to the longitudinal axis of the piston.

In the failsafe position shown in FIGS. 4 and 7A, the failsafe surface 52 still engages the rolling members 24. When the cylindrical portion of the failsafe surface 52 engages the rolling members 24, the failsafe surface aids in maintaining the coupled relationship between the master unit 12 and the tool unit 14 even though there is no significant opposing axial force created. However, when the piston 30 attempts to move past the ridge or retarding surface 52A there will be an opposing axial force created by the engagement of the ridge with the rolling members 24. This will provide at least a slight and positive resistance that must be overcome in order for the piston 30 to move to the unlocked position. That is, as the rolling members attempt to clear the ridge, there will be at least a slight opposing axial force created.

When the piston 30 assumes the unlocked position, the locking race 60 is free to move from the coupled position. More particularly, the unlocking surface 56 permits the rolling members 24 to assume the position shown in FIG. 6, which in turn frees the locking race 60, which of course means that the tool unit 14 can be decoupled from the master unit 12.

In FIGS. 8-11C, a second embodiment is shown for the contact area of the head 40 of the piston 30. In the embodiment shown in FIG. 1, the failsafe surface 52 comprised a ridge disposed between the locking surface 50 and the contact or unlocking surface 56. In this embodiment the failsafe surface 52 forms a generally conical shape surface between the locking surface 50 and the contact or unlocking surface 56. That is, as viewed in FIGS. 11A and 11B, the failsafe surface 52 extends upwardly and slightly outwardly to a point where the failsafe surface joins the contact or unlocking surface 56. If the failsafe surface 52 is projected downwardly around the piston 30, the projecting lines would form a cone. As seen in FIG. 11A, as the piston moves from the locked position shown in FIG. 8 to the unlocked position shown in FIG. 10, it is seen that the conical surface 52 retards the movement of the piston and gives rise to at least a slight resistance to the movement of the piston. Effectively, the rolling members 24 are slightly compressed between the conical surface 52 and the locking surface 62 of the locking race 60.

Figure 11A:
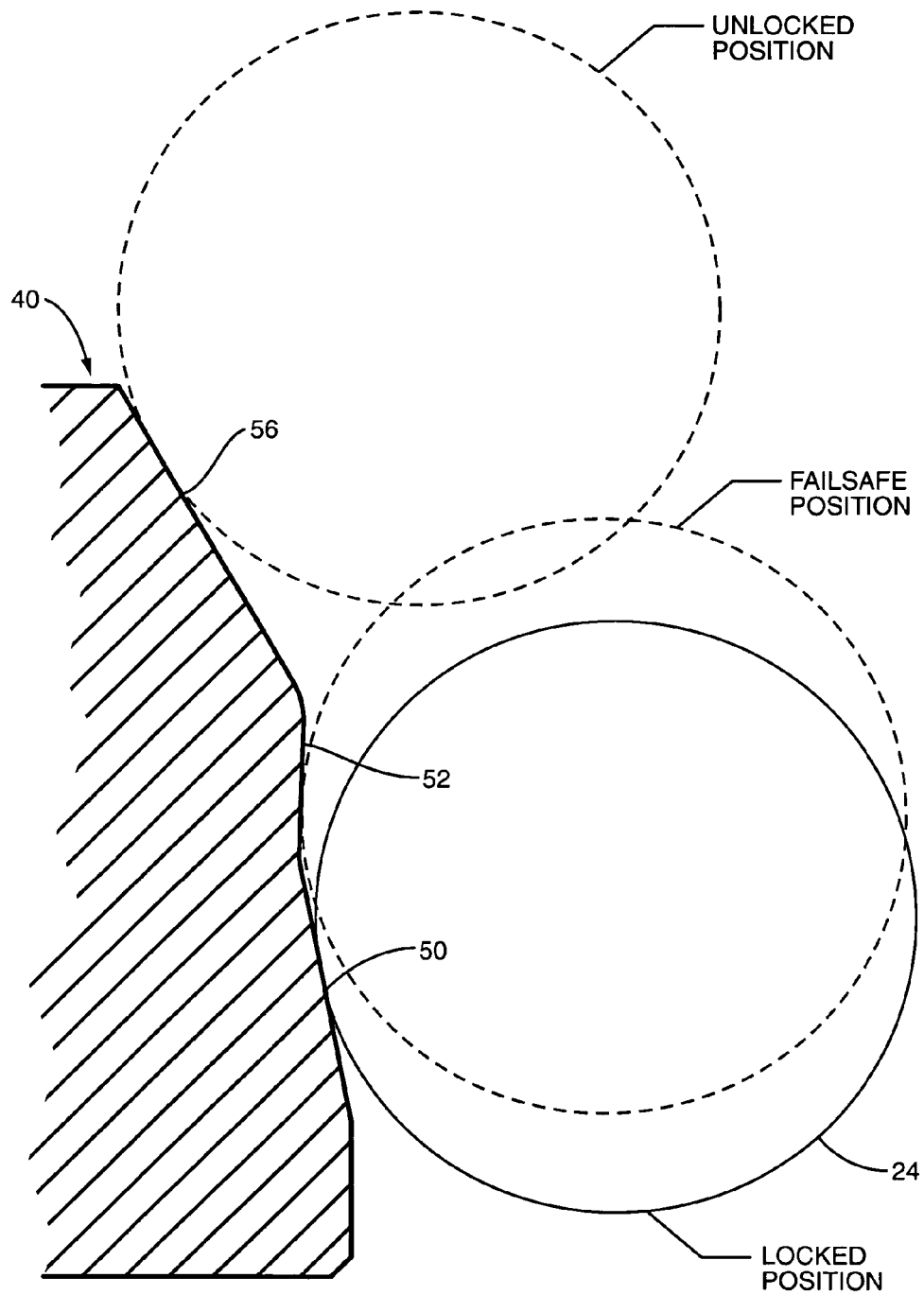
FIG. 11A is a schematic illustration of the piston of the alternative embodiment illustrating the movement of the piston with respect to a rolling member between locked, failsafe and unlocked positions.
Figure 11B:
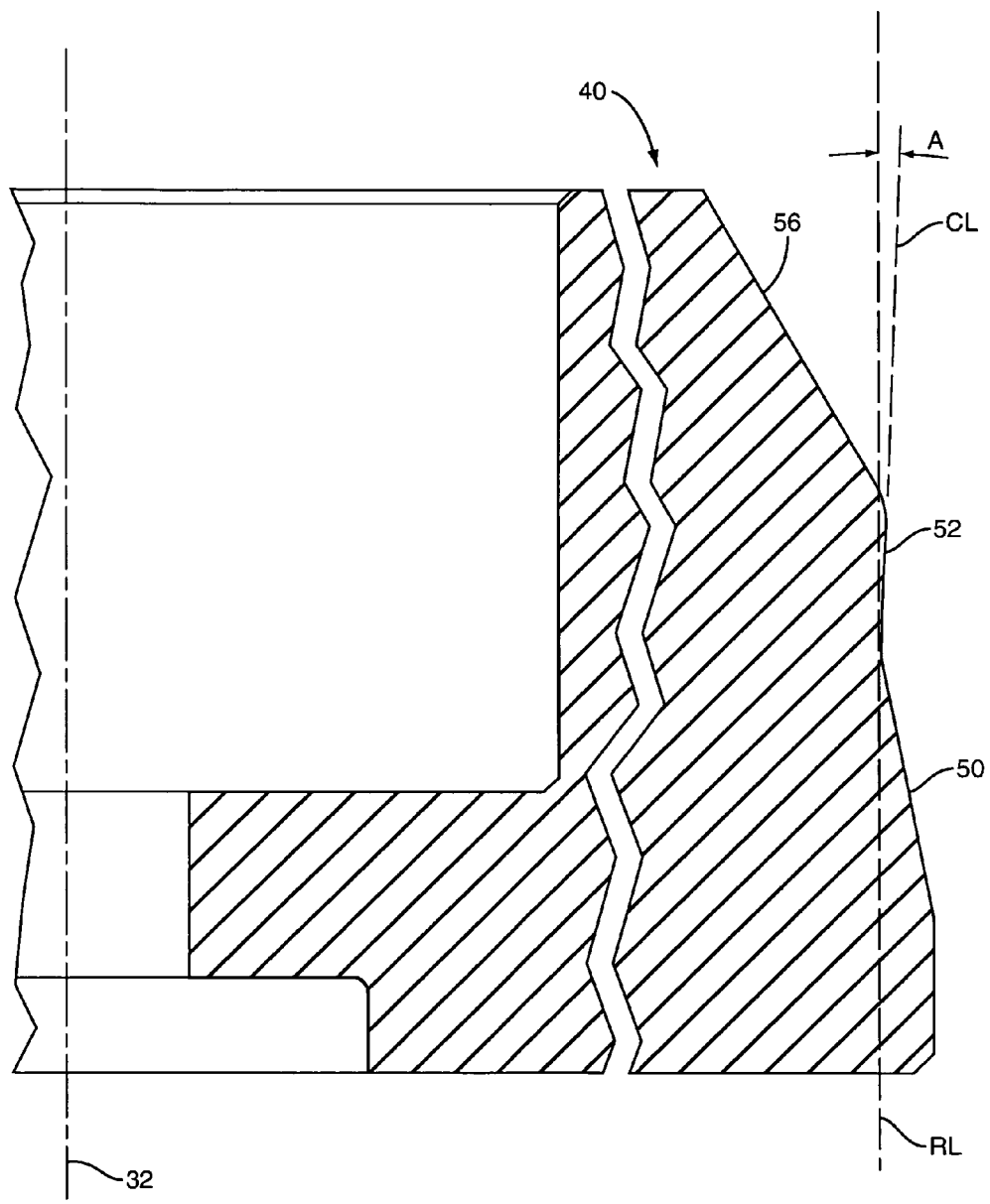
FIG. 11B is a schematic illustration similar to FIG. 11A, but showing the contact area of the piston with respect to the longitudinal axis of the piston.

Preferably, the angle of the conical surface 52 is slight. As illustrated in FIG. 11B, the angle of the conical surface 52 with respect to a reference line RF, which is parallel to the longitudinal axis 32 of the piston, is preferably about 2° but may range from approximately 1° to 5°. Note that the angle of the conical surface 52 is represented by angle A (FIG. 11B) which is formed by reference line RF and construction line CL which is an extension of the conical or retarding surface 52.

Figure 8:
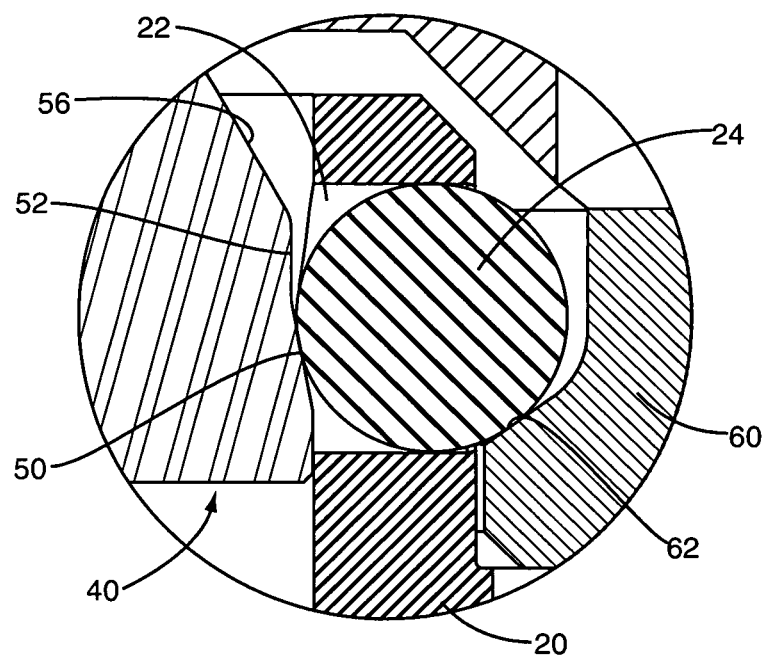
FIG. 8 is an enlarged view of a portion of the tool changer showing an alternate design for the piston and with the piston being shown in the locked position.

Briefly reviewing the second embodiment shown in FIGS. 8-11B, in FIG. 8 the piston 30 assumes the locked position. Here the locking surface 50 engages the rolling members 24 and urges the rolling members outwardly to where the rolling members engage the locking surface 62 of the locking race 60 of the tool unit 14. This pulls the locking race 60 downwardly into a locked position.

Figure 9:
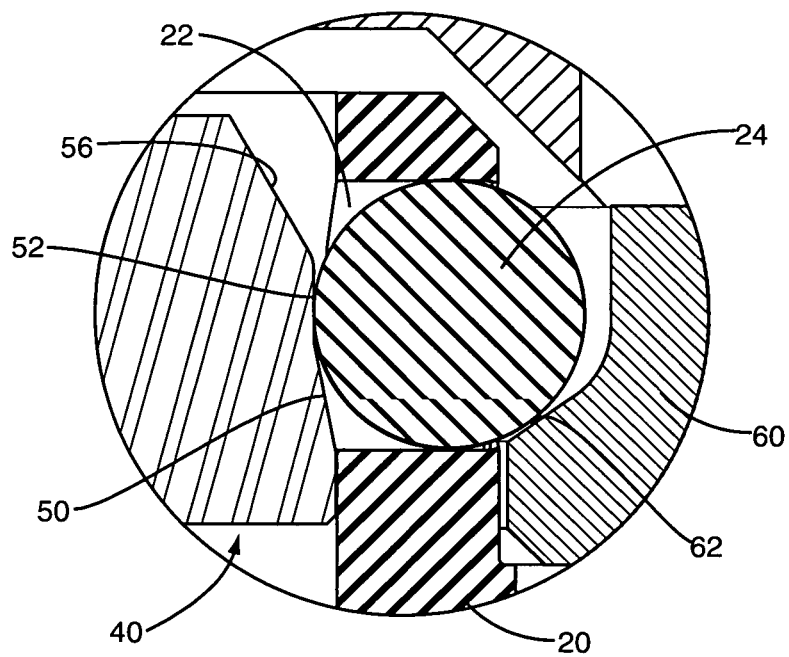
FIG. 9 is a view similar to FIG. 8, but wherein the piston is disposed in the failsafe position.
Figure 10:
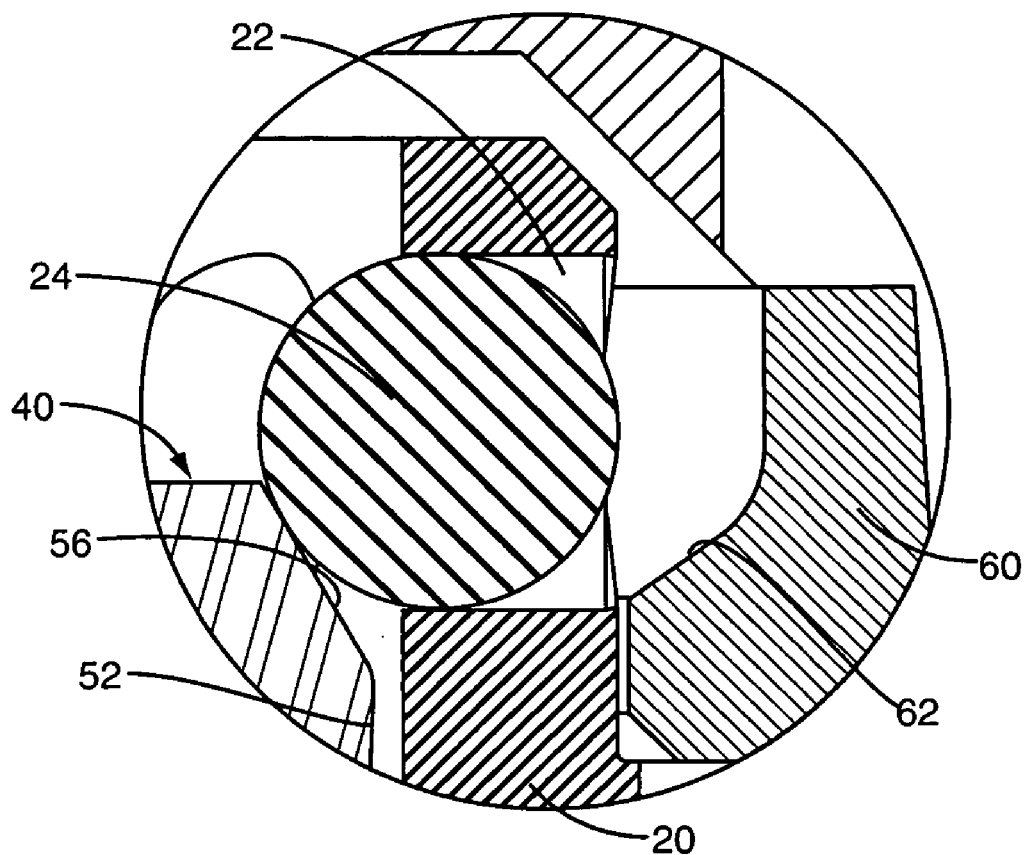
FIG. 10 is a view similar to FIG. 8 wherein the piston is disposed in the unlocked position.

If there is a failure in the activating force for the piston 30, the piston 30 will tend, as viewed in FIG. 9, to move downwardly to where the rolling members 24 engage the failsafe surface 52. Since the failsafe surface 52 is conical or angled with respect to the longitudinal axis 32 of the piston, the rolling members 24 will be urged at least slightly outwardly as the piston 30 moves from the locked position to the unlocked position. That is, the conical or angled failsafe surface 52 generally prevents the piston from inadvertently moving from the locked position to the unlocked position. This is because the conical shape of the surface 52 forms a retarding surface which effectively retards the movement of the piston downwardly as viewed in FIG. 9 without an active unlocking force being applied to the piston.

Figure 11C:
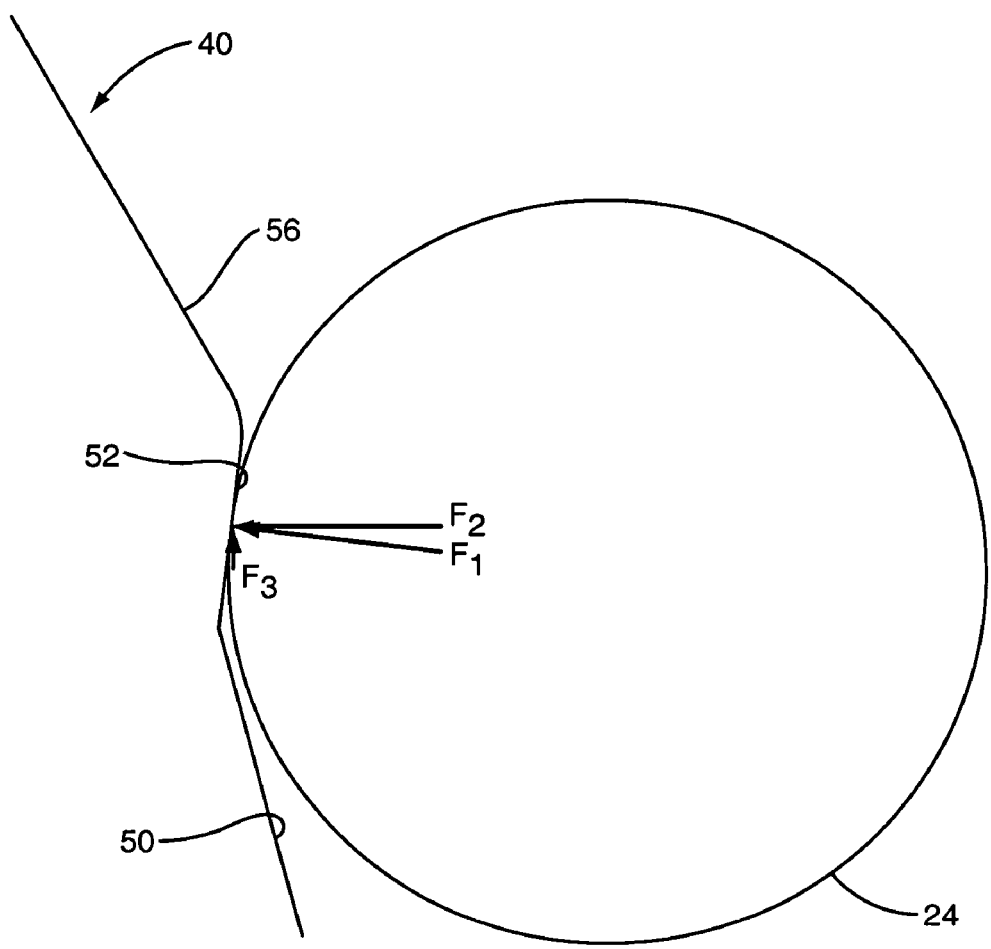
FIG. 11C is a schematic illustration of the force components that result as a rolling member moves from the locked position to the unlocked position with respect to the embodiment shown in FIGS. 8-11B.

With reference to FIG. 11C, there is a schematic illustration of the opposing axial force that is created or which results when the piston 30 moves from the locked position to the unlocked position. Note that as the rolling members 24 engage the conical surface 52 that a normal force $F_1$ is created. This force acts perpendicular to conical surface 52 and is directed generally horizontally and slightly upwardly as viewed in FIG. 11C. Force $F_1$ includes a horizontal force component $F_2$ and a vertical or upwardly axial force component $F_3$. It is the axial force component $F_3$ that must be overcome in order for the piston 30 to move from the locked position to the unlocked position.

Figure 12:
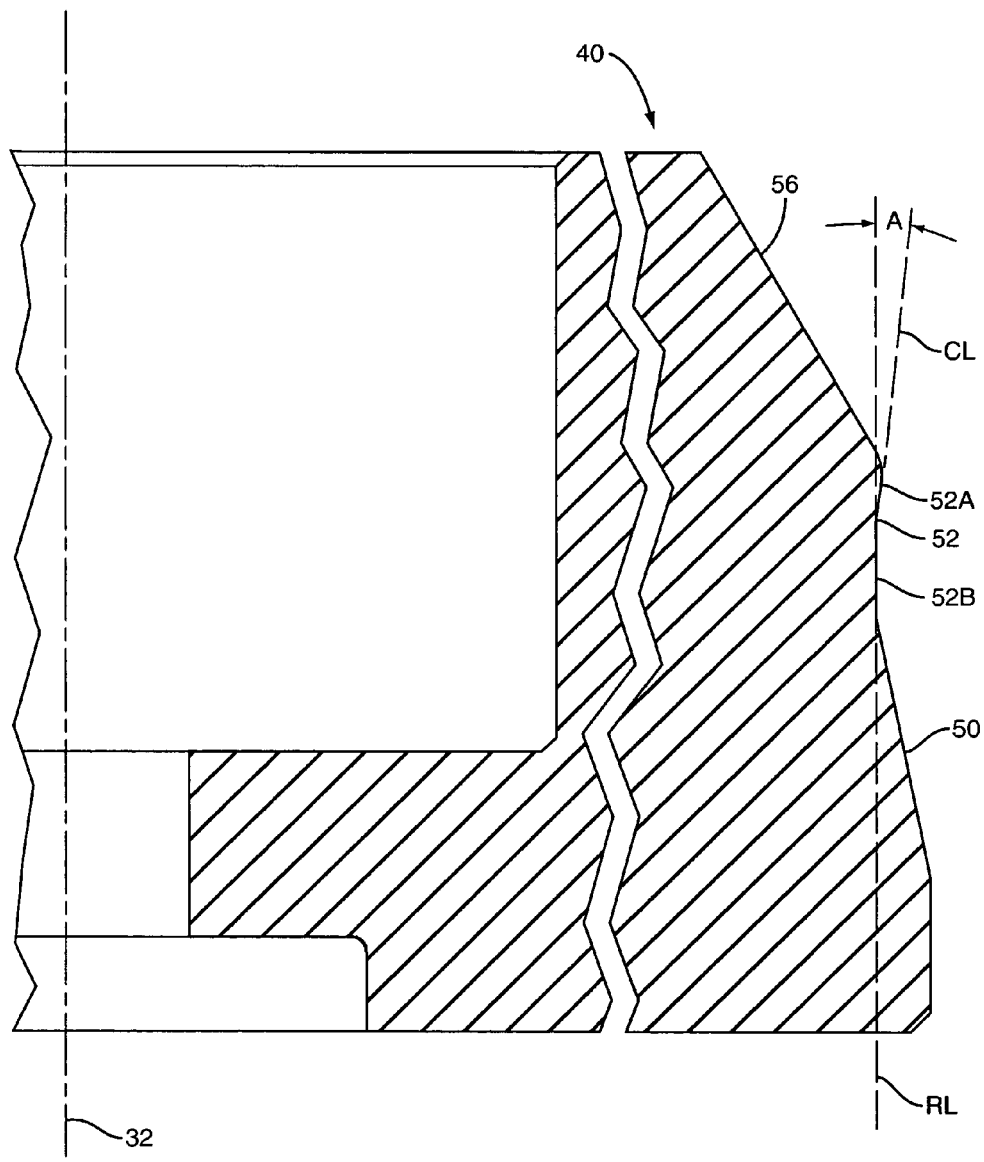
FIG. 12 is a schematic illustration showing another alternate design for the contact area of the piston.

FIG. 12 illustrates a third embodiment of the contact area of the piston head 40. In this case, the failsafe surface 52 includes two portions. First there is a generally cylindrical portion 52B and a second conical portion 52A. This design is similar to the embodiment shown in FIGS. 1-7B with the exception that the conical surface 52B assumes the position of the ridge in the embodiment of FIGS. 1-7B. In any event, in this embodiment, as the piston 30 moves from the locked position to the unlocked position, the rolling members will first engage the cylindrical portion 52B of the failsafe surface, and thereafter will engage the conical or angled surface 52B. Again, the conical or angled surface 52B will retard the movement of the piston 30 and prevent the piston 30 from inadvertently or accidentally moving past the conical or angled surface 52B to the unlocked position.

Figure 13:
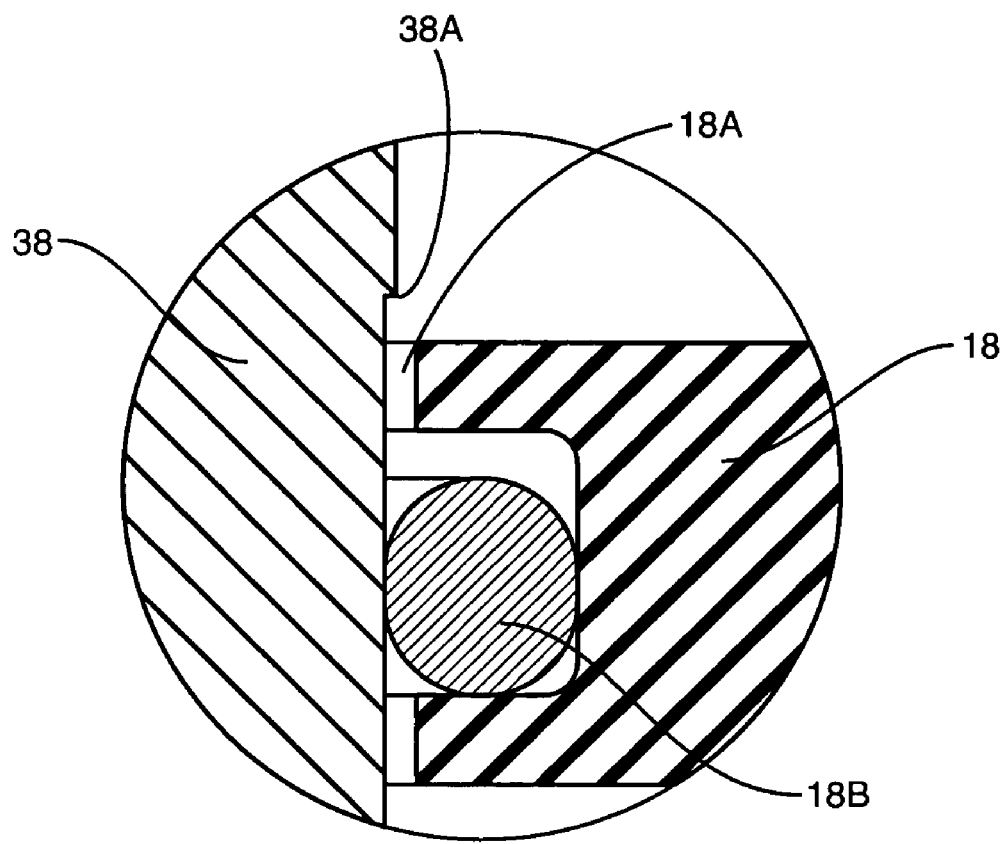
FIG. 13 is an enlarged view of the encircled area shown in FIG. 1 and denoted XII.

There are other ways to retard the movement of the piston from the failsafe position to the unlocked position. In FIG. 13 a portion of the stem 38 of the piston 30 is shown adjacent the horizontal member 18. Stem 38 is provided with a step 38A. The dimension of the step can vary. In one embodiment it is contemplated that the step 38A will project outwardly from the stem 38 approximately 0.005 to 0.010 inches. As the stem 38 moves downwardly, as viewed in FIG. 13, the step 38A will pass through the opening 18A of the horizontal member 18. In passing through the opening 18A, the step 38A will engage the O-ring 18B. The engagement of the step 38A with the O-ring 18B will at least slightly retard the further downward movement of the stem 38. The engagement of the step 38A with the O-ring 18B will tend to compress or slightly deform the O-ring 18B as the step 38A passes the same.

Step 38A is strategically placed on the stem 38 in order to protect against the inadvertent or accidental movement of the piston from the failsafe position to the unlocked position. Hence, when the piston 30 assumes the failsafe position, the step 38A would lie immediately above the O-ring 18B. If due to vibration or other external forces there was a tendency for the piston 30 to move to the unlocked position, step 38A would engage the O-ring 18B and at least slightly retard the further downward movement of the stem 38. This would effectively hold the piston in the failsafe position. However, because the step 38A is relatively small, its presence on a stem 38 would not inhibit or interfere with the normal up and down operation of the stem 38 as it and the piston moves between locked and unlocked positions.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:
1. A robotic tool changer comprising:
   a. a first unit;
   b. a second unit;
   c. a plurality of rolling members disposed in a retention area in one of the units;
   d. a piston movably mounted in one of the units of the robotic tool changer and movable between locked and unlocked positions;
   e. in the locked position, the piston is operative to engage the rolling members in one of the units and to urge the rolling members against a surface of the other unit to lock the two units together;
   f. the piston including a stem movable back and forth through an opening in the robotic tool changer; and
   g. wherein the stem of the piston includes a step for engaging a portion of the opening and wherein the engagement of the step of the piston with a portion of the opening tends to at least slightly restrain the movement of the piston during at least a portion of the piston's movement as the piston moves from the locked position to the unlocked position.

2. The robotic tool changer of claim 1 wherein the opening includes an O-ring and wherein the step and O-ring are spaced with respect to each other such that as the piston moves from the locked position to the unlocked position the step will engage the O-ring.

3. The robotic tool changer of claim 2 wherein the step and O-ring are configured such that as the piston moves from the locked position to the unlocked position the engagement of the step with the O-ring will cause the O-ring to be at least slightly deformed and the O-ring will at least slightly retard the movement of the piston.

4. The robotic tool changer of claim 1 wherein the piston may assume a failsafe position between the locked and unlocked positions, and wherein the stem and opening are configured to apply a greater resistance to movement of the piston between the failsafe position and the unlocked position than between the locked position and the failsafe position.

5. The robotic tool changer of claim 1 wherein the piston may assume a failsafe position between the locked and unlocked positions and where the piston includes a contact area where portions of the contact area engage the rolling members; and wherein the contact area includes a contact surface, a locking surface, and a failsafe surface disposed between the contact surface and the locking surface, and wherein the contact area includes a retarding surface disposed generally between the failsafe surface and the contact surface that at least slightly retards the movement of the piston as the piston moves from the failsafe position to the unlocked position.

6. The robotic tool changer of claim 5 wherein at least a portion of the retarding surface extends outwardly past the failsafe surface.

7. The robotic tool changer of claim 5 wherein the retarding surface comprises a ridge that is disposed generally between the failsafe surface and the contact or unlocking surface, and herein the ridge extends around the contact area of the piston.

8. The robotic tool changer of claim 5 wherein the retarding surface comprises a conical surface disposed generally between the failsafe surface and the contact or unlocking surface.

9. A robotic tool changer comprising:
   a. a first unit;
   b. a second unit;
   c. a piston movably mounted within one unit of the robotic tool changer and moveable between locked and unlocked positions;
   d. the piston including a stem movable back and forth through an opening in the robotic tool changer, the stem including a step for engaging a portion of the opening; and e. wherein the engagement of the step of the piston with a portion of the opening tends to at least slightly restrain the movement of the piston as the piston moves from the locked towards the unlocked position.

10. The robotic tool changer of claim 9 wherein the opening includes an O-ring and wherein the step and O-ring are spaced with respect to each other such that as the piston moves from the locked position to the unlocked position the step will engage the O-ring.

11. The robotic tool changer of claim 10 wherein the step and O-ring are configured such that as the piston moves from the locked position to the unlocked position, the engagement of the step with the O-ring will cause the O-ring to be at least slightly deformed and the O-ring will at least slightly retard the movement of the piston.

12. A robotic tool changer comprising:
a. a first unit;
b. a second unit;
c. a plurality of rolling members disposed in a retention area in one of the units;
d. a piston movably mounted within one of the units of the robotic tool changer and movable between locked and unlocked positions;
e. the piston including a locking surface, and a contact surface; and
f. the piston further including a failsafe surface disposed generally between the locking surface and the contact surface for engaging the rolling members and wherein at least a portion of the failsafe surface projects sufficiently outwardly such that as the piston moves between the locked and unlocked positions the engagement of the failsafe surface with the rolling members results in at least a slightly opposing force that must be overcome in order for the piston to move from the locked position to the unlocked position.

13. The robotic tool changer of claim 12 wherein the failsafe surface comprises a conical surface.

14. The robotic tool changer of claim 13 wherein the conical surface is oriented on the piston such that as the piston moves from the locked position to the unlocked position the rolling members are compressed between the conical surface and a locking surface associated with one of the units.

15. The robotic tool changer of claim 14 wherein the conical surface forms an angle of approximately 1°- 5° with respect to a reference line that extends generally parallel to a longitudinal axis of the piston.

16. The robotic tool changer of claim 12 wherein the outwardly projecting portion of the failsafe surface comprises a ridge.

17. The robotic tool of claim 12 wherein the failsafe surface includes an angled surface area which projects at least slightly outwardly from the piston and provides at least a slight resistance to the movement of the piston as the piston moves from the locked position to the unlocked position.

18. The robotic tool changer of claim 16 wherein the ridge that forms at least a part of the failsafe surface projects from the piston for engagement with the rolling members as the piston moves from the locked position to the unlocked position.

19. The robotic tool changer of claim 12 wherein the failsafe surface includes a cylindrical surface and a ridge that projects outwardly from the cylindrical surface.

20. The robotic tool changer of claim 19 wherein the cylindrical surface lies between the locking surface and the ridge.

21. The robotic tool changer of claim 19 wherein the ridge lies generally between the unlocking surface and the cylindrical surface.

22. The robotic tool changer of claim 19 wherein the ridge lies generally adjacent the unlocking surface and the cylindrical surface lies generally adjacent the locking surface.

23. The robotic tool changer of claim 12 wherein the failsafe surface includes a cylindrical surface and a conical surface that projects at least slightly outwardly from the cylindrical surface.

24. The robotic tool changer of claim 23 wherein the cylindrical surface lies between the locking surface and the conical surface.

25. The robotic tool changer of claim 23 wherein the conical surface lies generally between the unlocking surface and the cylindrical surface.

26. The robotic tool changer of claim 23 wherein the cylindrical surface lies generally adjacent the locking surface and the conical surface lies generally adjacent the unlocking surface.

27. The robotic tool changer of claim 12 wherein the failsafe surface includes a conical surface that is disposed between the locking surface and the unlocking surface and includes at least a portion that projects outwardly as the conical surface extends towards the unlocking surface.

28. A robotic tool changer comprising:
a. a first unit;
b. a second unit;
c. a plurality of rolling members disposed in a retention area in one of the units;
d. a locking surface associated with the other unit and adapted to be engaged by the rolling members such that the engagement of the rolling members with the locking surface locks the first and second units together;
e. a piston movably mounted within one of the units of the robotic tool changer and movable between locked and unlocked positions;
f. the piston including a locking surface and a contact surface;
g. the piston further including a failsafe surface disposed between the piston locking surface and the contact surface, the failsafe surface including at least a portion that projects outwardly from the piston in the path of at least a portion of the rolling members such that as the piston moves from the locked position to the unlocked position the outwardly projecting portion of the failsafe surface engages the rolling members and urges the rolling members towards the locking surface in the other unit, retarding the movement of the piston; and
h. wherein the failsafe surface is configured such that as the piston moves from the locked position to the unlocked position, the outwardly projecting portion of the failsafe surface will engage the rolling members and an opposing force will result that must be overcome in order for the piston to be moved from the locked position to the unlocked position.

29. The robotic tool changer of claim 28 wherein the failsafe surface comprises a conical surface.

30. The robotic tool changer of claim 29 wherein the conical surface forms an angle with a reference line that extends generally parallel to the longitudinal axis of the piston.

31. The robotic tool changer of claim 30 wherein the conical surface forms an angle of approximately 1°-5° with respect to a reference line that extends parallel to the longitudinal axis of the piston.

32. The robotic tool changer of claim 28 wherein the failsafe surface includes a ridge for engaging the rolling members as the piston moves from the locked position to the unlocked position.

33. The robotic tool changer of claim 32 wherein the failsafe surface further includes a cylindrical surface that extends generally parallel with respect to the longitudinal axis of the piston.

34. The robotic tool changer of claim 33 wherein the cylindrical surface is disposed generally adjacent the piston locking surface and the ridge is disposed generally adjacent the unlocking surface.

35. The robotic tool changer of claim 28 wherein the failsafe surface is configured such that as the piston moves away from the locked position and towards the unlocked position, at least a portion of the failsafe surface projects sufficiently outwardly to move the rolling members at least slightly outwardly resulting in a retarding force being applied to the piston as the piston moves towards the unlocked position.

36. The robotic tool changer of claim 35 wherein the failsafe surface includes a ridge.

37. The robotic tool changer of claim 35 wherein the failsafe surface includes a conical surface.

38. A method of preventing the accidental decoupling of master and tool units of a robotic tool changer having a piston that engages rolling members to lock the units together and which is movable between locked and unlocked positions, comprising:

retarding the movement of the piston from the locked position to the unlocked position by providing a retarding surface on the piston generally between a locking surface and an unlocking surface on the piston where the retarding surface projects outwardly from the piston and at least slightly engages the rolling members, urging the rolling members outwardly from a longitudinal axis of the piston as the piston moves from the locked position to the unlocked position.

39. The method of claim 38 including projecting a ridge from the piston where the ridge forms at least a part of the retarding surface and lies generally between the locking surface and the unlocking surface.

40. The method of claim 38 including incorporating a conical surface on the piston which lies generally between the locking surface and the retarding surface.

41. The method of claim 38 including configuring the retarding surface such that as the piston moves between the locked and unlocked positions the retarding surface engages the rolling members and an opposing force results and wherein the opposing force must be overcome in order for the piston to move from the locked position to the unlocked position.

42. A robotic tool changer comprising:
a. a first unit including a piston movably mounted therein, the piston being moveable between locked and unlocked positions;
b. a second unit having a locking surface;
c. the piston including a stem movable back and forth through an opening in the first unit, the opening operative to seal against the stem by a deformable member, and wherein the stem includes an outwardly projecting step operative to at least partially compress the deformable member so as to at least slightly restrain the movement of the piston as the piston moves from the locked towards the unlocked position; and
d. the piston further including a contact surface and a locking surface, each angled with respect to a longitudinal axis of the piston so as to engage rolling members and urge the rolling members towards and against the second unit locking surface as the piston moves from the unlocked position to the locked position;
e. the piston further including a failsafe surface disposed between the contact and locking surfaces on the piston, the failsafe surface including at least a portion that projects outwardly from the piston and is operative to engage the rolling members and urge the rolling members towards the second unit locking surface, retarding the movement of the piston from the locked position towards the unlocked position.

43. The method of claim 42 wherein the failsafe surface is cylindrical about the longitudinal axis of the piston, and wherein the outwardly projecting portion of the failsafe surface comprises a ridge.

44. The method of claim 42 wherein the failsafe surface is angled with respect to the longitudinal axis of the piston in a direction opposite to the angle of the contact and locking surfaces.

45. The method of claim 42 wherein the deformable member comprises an O-ring.

* * * * *